US012614678B2

(12) United States Patent
Koarashi et al.

(10) Patent No.: US 12,614,678 B2
(45) Date of Patent: Apr. 28, 2026

(54) SOLID-ELECTROLYTIC CAPACITOR AND METHOD FOR MANUFACTURING SOLID-ELECTROLYTIC CAPACITOR

(71) Applicant: TOKIN Corporation, Shiroishi (JP)

(72) Inventors: Genki Koarashi, Shiroishi (JP);
Masami Ishijima, Shiroishi (JP);
Tadamasa Asami, Shiroishi (JP);
Yasuhisa Sugawara, Shiroishi (JP)

(73) Assignee: TOKIN CORPORATION, Shiroishi (JP)

( * ) Notice: Subject to any disclaimer, the term of this patent is extended or adjusted under 35 U.S.C. 154(b) by 184 days.

(21) Appl. No.: 18/752,406

(22) Filed: Jun. 24, 2024

(65) Prior Publication Data

US 2025/0014834 A1 Jan. 9, 2025

(30) Foreign Application Priority Data

Jun. 29, 2023 (JP) ................................. 2023-106818

(51) Int. Cl.
| | |
|---|---|
| *H01G 9/15* | (2006.01) |
| *H01G 9/00* | (2006.01) |
| *H01G 9/025* | (2006.01) |
| *H01G 9/048* | (2006.01) |
| *H01G 9/07* | (2006.01) |

(52) U.S. Cl.
CPC ........... *H01G 9/025* (2013.01); *H01G 9/0032* (2013.01); *H01G 9/0036* (2013.01); *H01G 9/048* (2013.01); *H01G 9/07* (2013.01); *H01G 9/15* (2013.01)

(58) Field of Classification Search
None
See application file for complete search history.

(56) References Cited

U.S. PATENT DOCUMENTS

| | | | | |
|---|---|---|---|---|
| 10,229,792 B2 * | 3/2019 | Harada | ................ | H01G 9/0425 |
| 2010/0182734 A1 * | 7/2010 | Ning | .................... | H01G 9/0036 |
| | | | | 427/80 |
| 2015/0213962 A1 * | 7/2015 | Koseki | ................... | H01G 9/028 |
| | | | | 427/80 |
| 2018/0061585 A1 * | 3/2018 | Harada | .................... | H01G 9/07 |
| 2025/0014834 A1 * | 1/2025 | Koarashi | ............. | H01G 9/0036 |
| 2025/0166928 A1 * | 5/2025 | Koyanagi | ............. | H01G 9/025 |

FOREIGN PATENT DOCUMENTS

| | | | | | |
|---|---|---|---|---|---|
| CN | 109074959 A | * | 12/2018 | ............. | H01G 9/145 |
| JP | H0669082 A | | 3/1994 | | |
| JP | 2012174948 A | * | 9/2012 | | |
| WO | WO-2012041506 A2 | * | 4/2012 | ............. | H01G 9/045 |
| WO | WO-2023145618 A1 | * | 8/2023 | ............... | C09D 4/00 |

OTHER PUBLICATIONS

Translation of CN '959 (Year: 2018).*
Translation of WO '618 (Year: 2023).*

* cited by examiner

*Primary Examiner* — Dion R. Ferguson
(74) *Attorney, Agent, or Firm* — McCoy Russell LLP

(57) ABSTRACT

A solid-electrolytic capacitor according to an aspect of the present disclosure includes an anode member made of a valve metal, a dielectric layer formed on the anode member, and a solid electrolyte layer formed on the dielectric layer. The solid electrolyte layer includes a first electrolyte layer formed on the dielectric layer and a second electrolyte layer formed on the first electrolyte layer, in which the first electrolyte layer is an ion-conducting electrolyte layer and the second electrolyte layer is an electron-conducting electrolyte layer.

11 Claims, 5 Drawing Sheets

SILANE COUPLING REACTION

1

SOLID-ELECTROLYTIC CAPACITOR AND METHOD FOR MANUFACTURING SOLID-ELECTROLYTIC CAPACITOR

INCORPORATION BY REFERENCE

This application is based upon and claims the benefit of priority from Japanese patent application No. 2023-106818, filed on Jun. 29, 2023, the disclosure of which is incorporated herein in its entirety by reference.

BACKGROUND

The present disclosure relates to a solid-electrolytic capacitor and a method for manufacturing a solid-electrolytic capacitor.

In recent years, solid-electrolytic capacitors have been widely used in various fields such as the field of electronic apparatuses. Japanese Unexamined Patent Application Publication No. H6-69082 discloses a technology for a solid-electrolytic capacitor in which a conductive polymer is used as a solid electrolyte.

SUMMARY

As mentioned above, solid-electrolytic capacitors have been widely used in various fields such as the field of electronic apparatuses. Since sizes of electronic apparatuses have been becoming smaller in recent years, it has been required to miniaturize solid-electrolytic capacitors. Therefore, as it is necessary to miniaturize solid-electrolytic capacitors while at the same time maintaining their capacitances, it is necessary to improve the capacitance appearance ratio per unit volume of such solid-electrolytic capacitors.

In view of the above-described problem, an object of the present disclosure is to provide a solid-electrolytic capacitor capable of improving the capacitance appearance ratio thereof, and to provide a method for manufacturing such a solid-electrolytic capacitor.

A solid-electrolytic capacitor according to an aspect of the present disclosure includes: an anode member made of a valve metal; a dielectric layer formed on the anode member; and a solid electrolyte layer formed on the dielectric layer. The solid electrolyte layer includes: a first electrolyte layer formed on the dielectric layer; and a second electrolyte layer formed on the first electrolyte layer. Further, the first electrolyte layer is an ion-conducting electrolyte layer, and the second electrolyte layer is an electron-conducting electrolyte layer.

A method for manufacturing a solid-electrolytic capacitor according to an aspect of the present disclosure includes: a first step of forming a dielectric layer on an anode member made of a valve metal; and a second step of forming a solid electrolyte layer on the dielectric layer. The second step includes: a third step of forming a first electrolyte layer on the dielectric layer; and a fourth step of forming a second electrolyte layer on the first electrolyte layer. Further, the third step includes forming a layer containing a material represented by the below-shown Formula (1) on the dielectric layer.

$$\begin{array}{c} X^- \\ R^{1+} \\ | \\ R^2-O-Si-O-R^2 \\ | \\ O \\ \diagup \\ M \end{array} \tag{1}$$

2

Note that M in the above-shown Formula (1) represents a valve metal atom.

$R^{1+}$ represents a functional group of at least one type of cation selected from the group consisting of an imidazolium derivative, a pyrrolidinium derivative, a piperidinium derivative, a pyridinium derivative, a morpholinium derivative, an ammonium derivative, a phosphonium derivative, and a sulfonium derivative, and may have a carbon chain having a carbon number of 1 to 20 between the functional group of the cation and a Si molecule, and may have an ester bond, an ether bond, an amide bond, an imide bond, a carbon-carbon unsaturated bond, a carbon ring, or a heterocyclic ring between chains.

In the above-shown Formula (1), $R^2$ represents one of a hydrogen atom, a carbon chain having a carbon number of 1 to 4, a valve metal atom, or a multimer in which materials each represented by Formula (1) are condensation-polymerized and connected to each other by —Si—O—Si—.

In the above-shown Formula (1), $X^-$ represents at least one type of anion selected from chlorine, bromine, iodine, acetic acid, decanoic acid, sulfuric acid, lactic acid, nitric acid, benzoic acid, hydroxide, methylsulfate, methanesulfonic acid, ethanesulfonic acid, octanesulfonic acid, allylsulfonic acid, 1,1,2,2-tetrafluoroethanesulfonic acid, nonafluorobutanesulfonic acid, trifluoromethanesulfonic acid, p-toluenesulfonic acid, aminoacetic acid, trifluoroacetic acid, 2-hydroxy-2-phenylacetic acid, 2-aminopropanoic acid, thiosalicylic acid, thiocyanic acid, dicyanamide, dimethylphosphonic acid, diethylphosphonic acid, dibutylphosphonic acid, bis(2,4,4-trimethylpentyl)phosphonic acid, hexafluorophosphoric acid, tetrafluoroboric acid, hexafluoroantimonic acid, tetrachloroaluminic acid, tetrachloroferrate (III), tris(trifluoromethylsulfonyl)methane, bis(fluorosulfonyl)imide, bis(trifluoromethylsulfonyl)imide, and bis(pentafluoroethylsulfonyl)imide.

According to the present disclosure, it is possible to provide a solid-electrolytic capacitor capable of improving the capacitance appearance ratio thereof, and to provide a method for manufacturing such a solid-electrolytic capacitor.

The above and other objects, features and advantages of the present disclosure will become more fully understood from the detailed description given hereinbelow and the accompanying drawings which are given by way of illustration only, and thus are not to be considered as limiting the present disclosure.

3

DESCRIPTION OF EMBODIMENTS

<Solid-Electrolytic Capacitor>

Embodiments will be described hereinafter with reference to the drawings.

Figure 1:
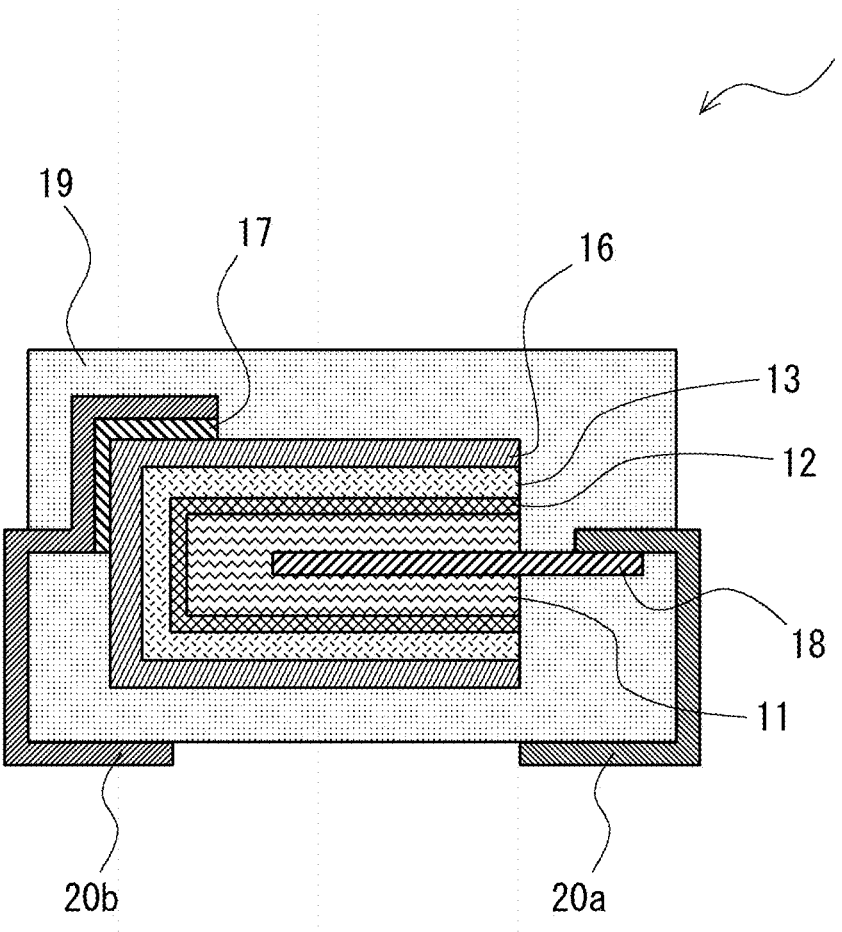
FIG. 1 is a cross-sectional diagram of a solid-electrolytic capacitor according to an embodiment.

FIG. 1 is a cross-sectional diagram of a solid-electrolytic capacitor according to an embodiment. As shown in FIG. 1, the solid-electrolytic capacitor 1 according to this embodiment includes an anode member 11, a dielectric layer 12, a solid electrolyte layer 13, a cathode layer 16, a conductive adhesive 17, an anode lead 18, an exterior resin 19, and lead frames 20a and 20b.

The anode member 11 is made of a porous valve metal. For the anode member 11, for example, at least one metal selected from tantalum (Ta), aluminum (Al), niobium (Nb), titanium (Ti), zirconium (Zr), hafnium (Hf), and tungsten (W), or an alloy of these metals can be used. In particular, for the anode member 11 at least one metal selected from tantalum (Ta), aluminum (Al), and niobium (Nb), or an alloy of these metals is preferably used. The anode member 11 is formed by using, for example, a plate-like, foil-like, or linear valve metal, a sintered compact containing fine particles of a valve metal, or a porous valve metal that has been subjected to a surface enlargement treatment by etching.

The dielectric layer 12 is formed on a surface of the anode member 11. For example, the dielectric layer 12 can be formed by anodizing a surface of the anode member 11. For example, the surface of the anode member 11 is porous, and the dielectric layer 12 is also formed in pores of the porous anode member 11. For example, when tantalum is used for the anode member 11, a tantalum oxide film (dielectric layer 12) can be formed on a surface of the anode member 11 by anodizing the anode member 11. For example, the thickness of the dielectric layer 12 can be adjusted as appropriate by the voltage in the anodization process.

The solid electrolyte layer 13 is formed on the dielectric layer 12. The solid electrolyte layer 13 is formed so as to be in contact with the entire surface of the dielectric layer 12. Details of the solid electrolyte layer 13 will be described later.

The cathode layer 16 is formed on the solid electrolyte layer 13. The cathode layer 16 can be formed by, for example, laminating (i.e., stacking) a carbon layer and a silver layer. Note that the carbon layer and the silver layer are merely examples of the materials of which the cathode layer 16 is formed, and it is not limited to being formed of any particular materials as long as the materials are conductive.

As described above, in the solid-electrolytic capacitor 1 according to this embodiment, the dielectric layer 12, the solid electrolyte layer 13, and the cathode layer 16 are successively laminated on the anode member 11. The anode member 11 includes an anode lead 18, and the anode lead 18 is connected to the lead frame 20a. For example, the anode lead 18 is connected to the lead frame 20a by welding. Further, the cathode layer 16 is connected to the lead frame 20b through the conductive adhesive 17. The solid-electrolytic capacitor 1 according to this embodiment is covered with the exterior resin 19 in a state in which parts of the two lead frames 20a and 20b are exposed to the outside.

<Structure of Solid Electrolyte Layer>

Figure 2:
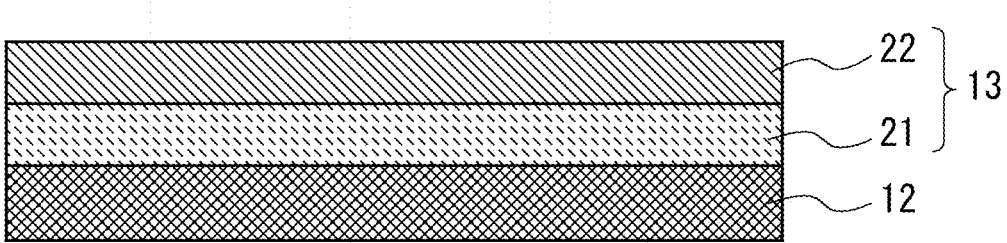
FIG. 2 is a cross-sectional diagram showing an example of a solid electrolyte layer provided in a solid-electrolytic capacitor according to an embodiment.

Next, details of the solid electrolyte layer 13 provided in the solid-electrolytic capacitor 1 according to this embodiment will be described. FIG. 2 is a cross-sectional diagram showing an example of a solid electrolyte layer provided in a solid-electrolytic capacitor according to this embodiment, and is an enlarged cross-sectional diagram of a part of the solid-electrolytic capacitor 1 shown in FIG. 1 including the dielectric layer 12 and the solid electrolyte layer 13 thereof.

As shown in FIG. 2, the solid electrolyte layer 13 includes a first electrolyte layer 21 and a second electrolyte layer 22. The first electrolyte layer 21 is formed on the dielectric layer 12. The first electrolyte layer 21 is an ion-conducting electrolyte layer, and the second electrolyte layer 22 is an electron-conducting electrolyte layer.

In this embodiment, the first electrolyte layer 21 includes, for example, a material represented by the below-shown Formula (1).

$$\text{R}^2\!-\!\text{O}\!-\!\overset{\displaystyle \overset{\text{X}^-}{\underset{|}{\text{R}^{1+}}}}{\underset{\displaystyle \underset{\text{M}}{\overset{|}{\text{O}}}}{\text{Si}}}\!-\!\text{O}\!-\!\text{R}^2 \tag{1}$$

Note that M in the above-shown Formula (1) represents a valve metal atom. That is, M is a valve metal atom constituting the anode member 11, specifically, a valve metal atom contained in the dielectric layer 12. For example, when the anode member 11 is composed of tantalum (Ta), the dielectric layer 12 is tantalum oxide ($Ta_2O_5$), and M is a tantalum atom.

In the above-shown Formula (1), $R^{1+}$ represents a functional group of at least one type of cation selected from the group consisting of an imidazolium derivative, a pyrrolidinium derivative, a piperidinium derivative, a pyridinium derivative, a morpholinium derivative, an ammonium derivative, a phosphonium derivative, and a sulfonium derivative, and may have a carbon chain having a carbon number of 1 to 20 between the functional group of the cation and a Si molecule, and may have an ester bond, an ether bond, an amide bond, an imide bond, a carbon-carbon unsaturated bond, a carbon ring, or a heterocyclic ring between chains.

In the above-shown Formula (1), $R^2$ represents one of a hydrogen atom, a carbon chain having a carbon number of 1 to 4, a valve metal atom, or a multimer in which materials each represented by Formula (1) are condensation-polymerized and connected to each other by —Si—O—Si—. Note that the multimer in which materials each represented by Formula (1) are connected by "—Si—O—Si—" is a multimer in which "—O—$R^2$" of materials which are adjacent to each other and each of which is represented Formula (1) are condensation-polymerized with each other, and the materials each represented Formula (1) are connected to each other by "—Si—O—Si—".

In the above-shown Formula (1), $X^-$ represents at least one type of anion selected from chlorine, bromine, iodine, acetic acid, decanoic acid, sulfuric acid, lactic acid, nitric acid, benzoic acid, hydroxide, methylsulfate, methanesulfonic acid, ethanesulfonic acid, octanesulfonic acid, allylsulfonic acid, 1,1,2,2-tetrafluoroethanesulfonic acid, nonafluorobutanesulfonic acid, trifluoromethanesulfonic acid, p-toluenesulfonic acid, aminoacetic acid, trifluoroacetic acid, 2-hydroxy-2-phenylacetic acid, 2-aminopropanoic acid, thiosalicylic acid, thiocyanic acid, dicyanamide, dimethylphosphonic acid, diethylphosphonic acid, dibutylphosphonic acid, bis(2,4,4-trimethylpentyl)phosphonic acid, hexafluorophosphoric acid, tetrafluoroboric acid, hexafluoroantimonic acid, tetrachloroaluminic acid, tetrachloroferrate (III), tris(trifluoromethylsulfonyl)methane, bis(fluoro-sulfonyl)imide, bis(trifluoromethylsulfonyl)imide, and bis (pentafluoroethylsulfonyl)imide.

Figure 4:
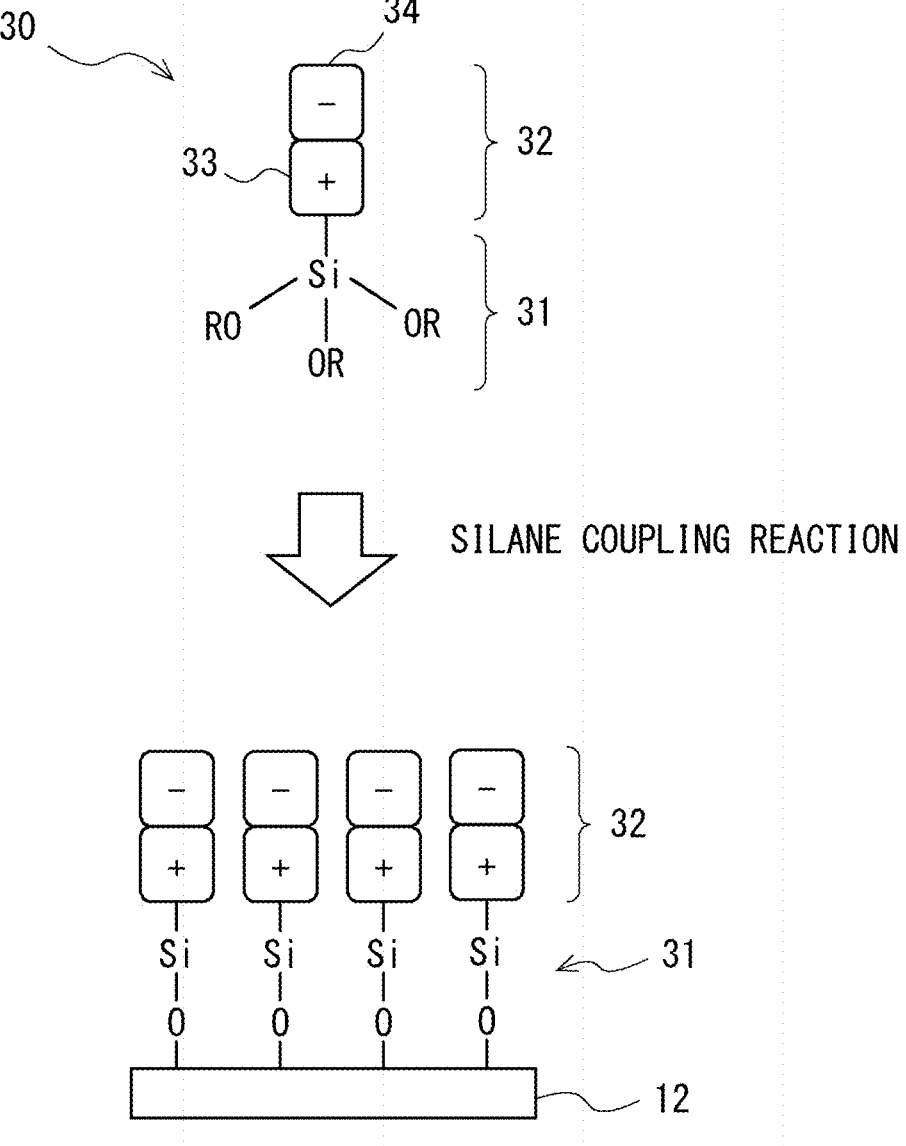
FIG. 4 is a schematic diagram for explaining a method for manufacturing a first electrolyte layer (Manufacturing Method A)
Figure 5:
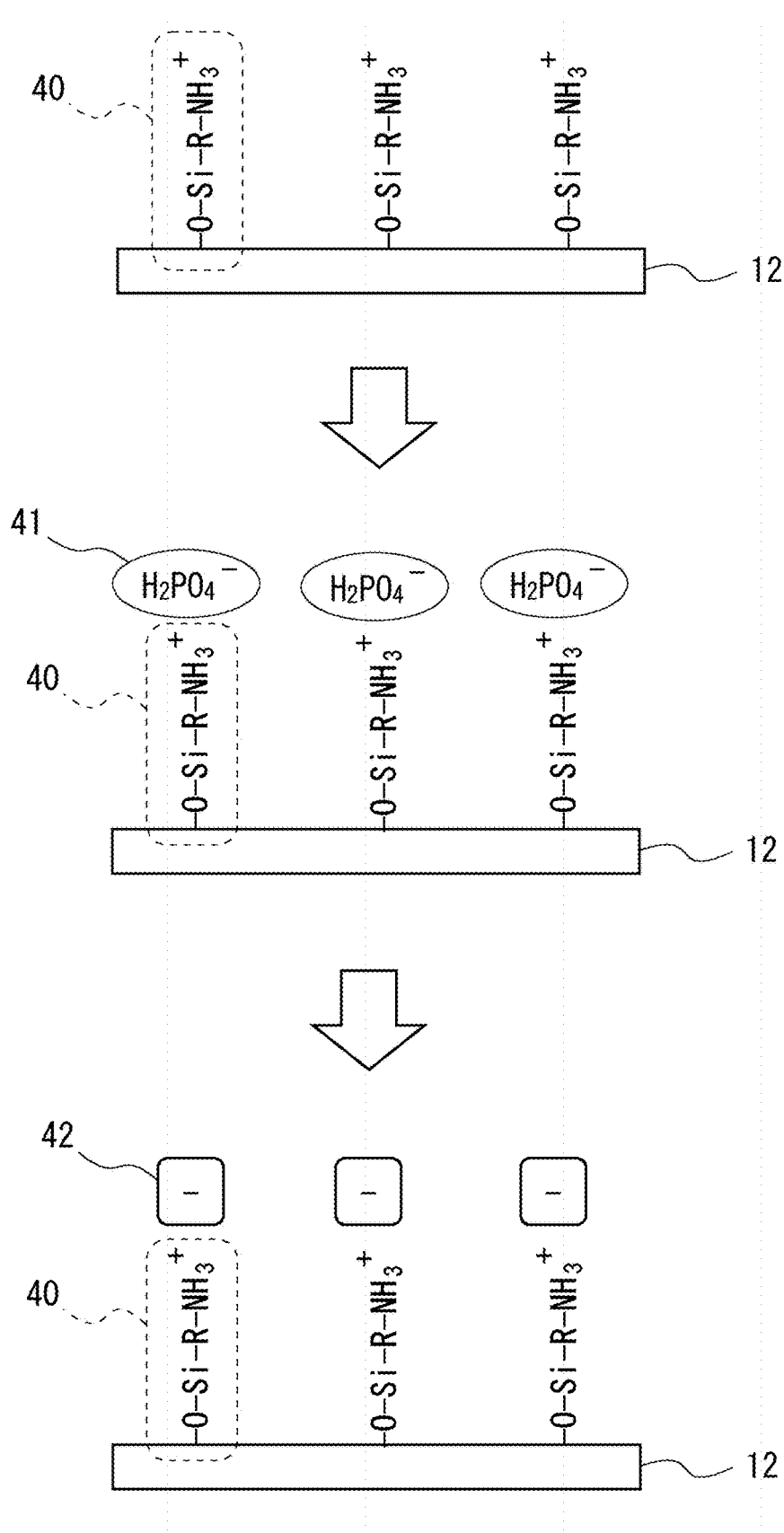
FIG. 5 is a schematic diagram for explaining a method for manufacturing a first electrolyte layer (Manufacturing Method B)
Figure 6:
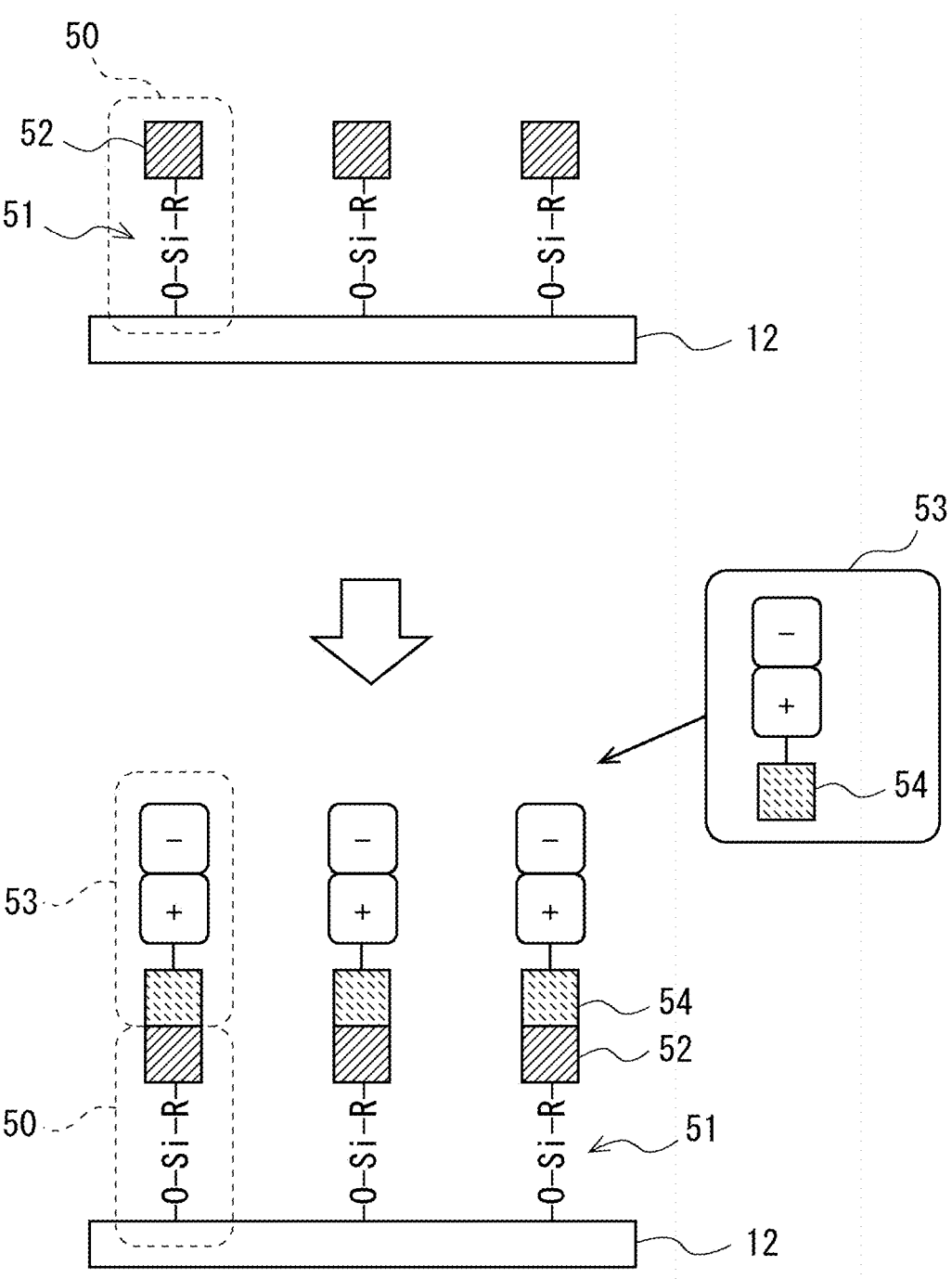
FIG. 6 is a schematic diagram for explaining a method for manufacturing a first electrolyte layer (Manufacturing Method C).

Further, in the first electrolyte layer 21, M in the above-shown Formula (1) is a valve metal atom present in the surface of the dielectric layer 12, and the first electrolyte layer 21 is covalently bonded in the surface of the dielectric layer 12 as represented by Si—O—M (see FIGS. 4 to 6). Further, the first electrolyte layer 21 is in contact with the second electrolyte layer 22.

Further, in this embodiment, the conductivity of the second electrolyte layer 22 is preferably higher than that of the first electrolyte layer 21.

The second electrolyte layer 22 is an electron-conducting electrolyte layer, and is composed of, for example, a conductive polymer. For the second electrolyte layer 22, for example, at least one type of conductive polymer selected from the group consisting of polyethylene dioxythiophene (PEDOT), polypyrrole, polythiophene, polyaniline, and their derivatives. The second electrolyte layer 22 can be formed by using, for example, chemical polymerization, electrolytic polymerization, or a method using a dispersion liquid containing a conductive polymer or a liquid containing a conductive polymer.

In this embodiment, a third electrolyte layer (not shown) may be further formed on the second electrolyte layer 22. The third electrolyte layer may be formed by using, for example, a conductive polymer. For the third electrolyte layer, for example, at least one type of conductive polymer selected from the group consisting of polyethylene dioxythiophene (PEDOT), polypyrrole, polythiophene, polyaniline, and their derivatives. The third electrolyte layer can be formed by using, for example, chemical polymerization, electrolytic polymerization, or a method using a dispersion liquid containing a conductive polymer or a liquid containing a conductive polymer. When the third electrolyte layer is formed, it is preferably formed by using a method different from the method by which the second electrolyte layer 22 is formed.

<Manufacturing Method of Solid-Electrolytic Capacitor>

Figure 3:
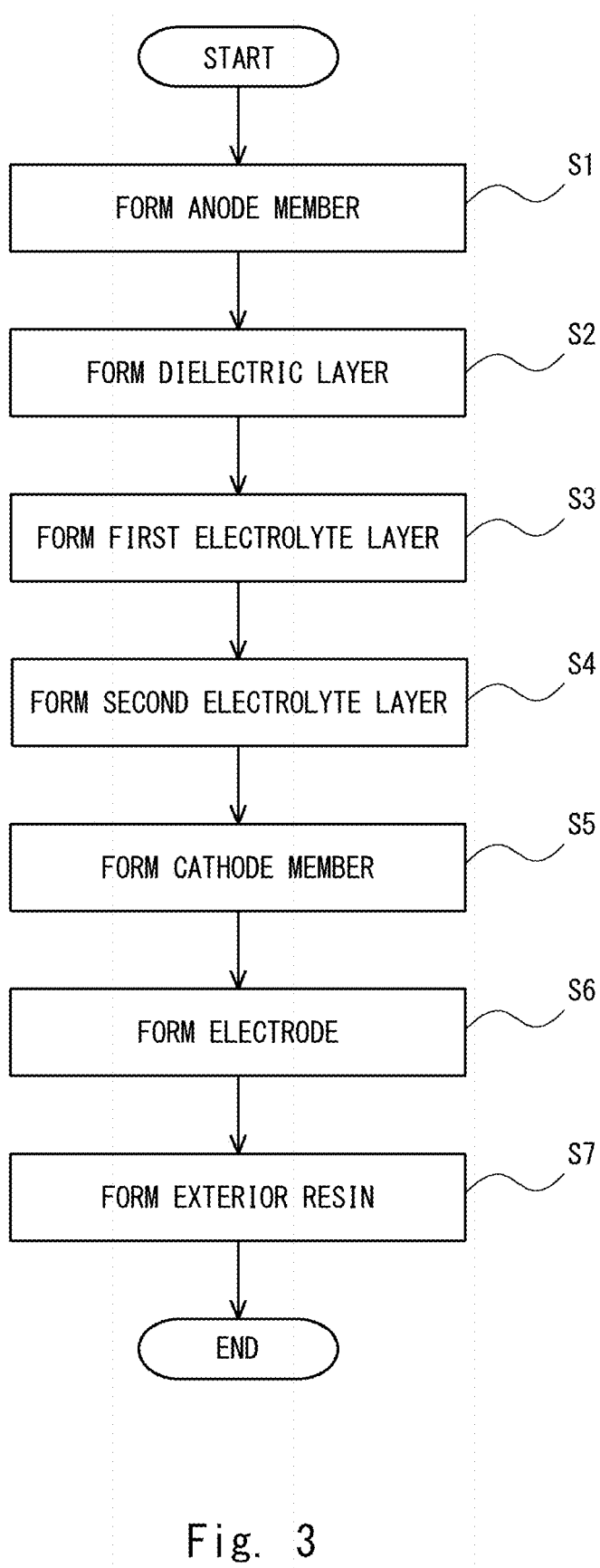
FIG. 3 is a flowchart for explaining a method for manufacturing a solid-electrolytic capacitor according to an embodiment.

Next, a method for manufacturing a solid-electrolytic capacitor according to this embodiment will be described. FIG. 3 is a flowchart for explaining a method for manufacturing a solid-electrolytic capacitor according to this embodiment. A method for manufacturing a solid-electrolytic capacitor will be described hereinafter with reference to FIGS. 1 and 2.

When a solid-electrolytic capacitor according to this embodiment is manufactured, firstly, an anode member 11 is formed (Step S1). A valve metal can be used for the anode member 11. The above-mentioned materials can be used as the valve metal.

Next, a dielectric layer 12 is formed in a surface of the anode member (valve metal) 11 by anodizing the anode member 11 (Step S2). After that, a first electrolyte layer 21 is formed on the dielectric layer 12 (Step S3). A material represented by the above-shown Formula (1) can be used for the first electrolyte layer 21. Note that details of the method for forming the first electrolyte layer 21 will be described later.

Next, a second electrolyte layer 22 is formed on the first electrolyte layer 21 (Step S4). The second electrolyte layer 22 can be formed by using, for example, a conductive polymer. For example, the second electrolyte layer 22 can be formed by using at least one type of conductive polymer selected from the group consisting of polyethylene dioxythiophene (PEDOT), polypyrrole, polythiophene, polyaniline, and their derivatives. The second electrolyte layer 22 can be formed by using chemical polymerization, electrolytic polymerization, or a method using a dispersion liquid containing a conductive polymer or a liquid containing a conductive polymer.

After the second electrolyte layer 22 is formed, a cathode layer 16 is formed (Step S5). The cathode layer 16 can be formed by, for example, laminating (i.e., stacking) a carbon layer and a silver layer.

Next, lead frames (electrodes) 20a and 20b are formed (Step S6). Specifically, the lead frame 20a is connected to the anode lead 18 by welding. Further, the lead frame 20b is connected to the cathode layer 16 by using a conductive adhesive 17.

After that, an exterior resin 19 is formed (Step S7). Note that the exterior resin 19 is formed so that parts of the two lead frames 20a and 20b are exposed to the outside. The resin used for the exterior resin 19 is not limited to any particular resins. For example, a thermosetting epoxy resin or a method for curing a liquid resin can be used.

A solid-electrolytic capacitor according to this embodiment can be manufactured by using the above-described method for manufacturing a solid-electrolytic capacitor.

<Manufacturing Method of First Electrolyte Layer 21>

Next, a method for manufacturing of a first electrolyte layer 21 will be described. Three manufacturing methods A to C will be described hereinafter as methods for manufacturing a first electrolyte layer 21.

(Manufacturing Method A)

Firstly, a Manufacturing Method A of a first electrolyte layer 21 will be described. In the Manufacturing Method A, firstly, an alkoxyl group $OR^3$ of an ionic liquid (hereinafter also expressed as an RTIL (Room Temperature Ionic Liquid)) represented by the below-shown Formula (2) is hydrolyzed, and an ionic liquid containing a silanol group represented by the below-shown Formula (3) is thereby obtained. After that, OH groups bonded to the surface of a dielectric layer 12 and the silanol group of the below-shown Formula (3) are dehydrated and condensed, so that a material represented by the above-shown Formula (1) is immobilized in the surface of the dielectric layer 12. Note that $R^3$ in the below-shown Formula (2) represents a carbon chain having a carbon number of 1 to 4. A more detailed description will be given hereinafter by using a schematic diagram.

$$R^3O-\underset{\underset{OR^3}{|}}{\overset{\overset{R^{1+}}{|}}{Si}}-OR^3 \quad X^- \tag{2}$$

$$HO-\underset{\underset{OH}{|}}{\overset{\overset{R^{1+}}{|}}{Si}}-OH \quad X^- \tag{3}$$

FIG. 4 is a schematic diagram for explaining a method for manufacturing a first electrolyte layer (Manufacturing Method A). As shown in FIG. 4, in the Manufacturing Method A, a first electrolyte layer 21 is formed by using an RTIL material 30 containing a silane coupling agent part 31 and a salt part 32 consisting of an anion and a cation. The salt part 32 contains a cation functional group 33 and an anion 34. Note that the cation functional group 33 corresponds to "$R^{1+}$" of the above-shown Formulas (2) and (3), and the anion 34 corresponds to "$X^-$" of the above-shown Formulas (2) and (3).

In the Manufacturing Method A, the first electrolyte layer 21 is formed by using the RTIL material 30 in which the silane coupling agent part 31 and the salt part 32 are integrated (i.e., combined) with each other. Specifically, as shown in a lower part of FIG. 4, the silane coupling agent part 31 of the RTIL material 30 and an OH group present in the surface of the dielectric layer 12 are made to have a silane coupling reaction therebetween, and the silane coupling agent part 31 is thereby immobilized in the surface of the dielectric layer 12. In this way, it is possible to immobilize the salt part 32 in the surface of the dielectric layer 12 by using the silane coupling agent part 31. In the structure shown in the lower part of FIG. 4, anions and cations are electrostatically bonded to each other in the salt part 32, and the anions can move along the positive electrical charge (i.e., in the left/right direction in the drawing).

(Manufacturing Method B)

Next, a Manufacturing Method B of a first electrolyte layer 21 will be described. In the Manufacturing Method B, firstly, an alkoxyl group of an amino-based silane coupling agent is hydrolyzed, and an amino-based silane coupling agent containing a silanol group is thereby obtained. After that, OH groups bonded to the surface of the dielectric layer 12 and the silanol group of the amino-based silane coupling agent are dehydrated and condensed, so that the amino-based silane coupling agent is immobilized on the surface of the dielectric layer 12 by the covalent bonding. After that, an acid containing an anion $X^-$ and/or salt are brought into contact with the amino-based silane coupling agent, so that they are bonded by an electrical interaction between the amino group and the anion $X^-$. As a result, a material represented by the above-shown Formula (1) is formed. A more detailed description will be given hereinafter by using a schematic diagram.

FIG. 5 is a schematic diagram for explaining a method for manufacturing a first electrolyte layer (Manufacturing Method B). As shown in FIG. 5, in the Manufacturing Method B, firstly, an amino-based silane coupling agent is prepared. Then, the alkoxyl group of the amino-based silane coupling agent is hydrolyzed, and an amino-based silane coupling agent containing a silanol group is thereby obtained. After that, as shown in an upper part of FIG. 5, OH groups bonded to the surface of the dielectric layer 12 and silanol groups of the amino-based silane coupling agent are dehydrated and condensed, so that the amino-based silane coupling agent 40 is immobilized on the surface of the dielectric layer 12 by the covalent bonding.

After that, as shown in a central part of FIG. 5, salt of the amino-based silane coupling agent 40 and phosphoric acid 41 ($H_2PO_4^-$) is formed. Next, as shown in a lower part of FIG. 5, ions of phosphoric acid 41 and those of RTIL anions 42 are exchanged. The residue (phosphoric acid and the like) in this process is washed away by alcohol. In this way, it is possible to immobilize the RTIL anions 42 in the surface of the dielectric layer 12. In the structure shown in the lower part in FIG. 5, the amino-based silane coupling agent 40 and the RTIL anions 42 are electrostatically bonded to each other, and the RTIL anions 42 can move the positive electrical charge (i.e., in the left/right direction in the drawing). The RTIL anions 42, which exchanges ions with the phosphoric acid 41, may be any anions that can constitute an RTIL. When the RTIL anions 42 are brought into contact with the salt of the amino-based silane coupling agent 40 and the phosphoric acid 41 ($H_2PO_4^-$), and their ions are exchanged, they may be in the form of an RTIL. Alternatively, a solution of salt containing anions that can constitute an RTIL (e.g., salt which is in a solid state at a room temperature, and in which cations are Li, K, or Na ions) may be used.

(Manufacturing Method C)

Next, a Manufacturing Method C of a first electrolyte layer 21 will be described. In the Manufacturing Method C, firstly, an alkoxyl group of at least one silane coupling agent selected from an amino-based silane coupling agent, an epoxy-based silane coupling agent, and a thiol-based silane coupling agent is hydrolyzed, and a silane coupling agent containing a silanol group is thereby obtained. After that, OH groups bonded to the surface of the dielectric layer 12 and the silanol group of the silane coupling agent are dehydrated and condensed, so that the amino-based silane coupling agent is immobilized on the surface of the dielectric layer 12 by the covalent bonding.

After that, an RTIL containing an epoxy group represented by the below-shown Formula (4) is brought into contact with a silane coupling agent immobilized on the surface of the dielectric layer 12, and then heated. As a result, the epoxy group of the below-shown Formula (4) is bonded to an amino group, an epoxy group, or a thiol group of the silane coupling agent, and a material represented by the above-shown Formula (1) is thereby formed. A more detailed description will be given hereinafter by using a schematic diagram.

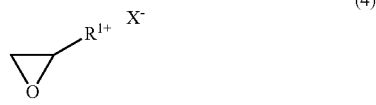

(4)

FIG. 6 is a schematic diagram for explaining a method for manufacturing a first electrolyte layer (Manufacturing Method C). As shown in an upper part of FIG. 6, a material 50 containing a silane coupling agent part 51 and an organic reaction part 52 is used in the Manufacturing Method C. Note that the organic reaction part 52 is an amino group, an epoxy group, or a thiol group. In the Manufacturing Method C, silane coupling agent parts 51 of the material 50 and OH groups present in the surface of the dielectric layer 12 are made to have a silane coupling reaction therebetween (dehydration and condensation), and the silane coupling agent parts 51 are thereby immobilized in the surface of the dielectric layer 12.

After that, as shown in a lower part of FIG. 6, RTILs 53 containing epoxy groups 54 are brought into contact with silane coupling agents 50 immobilized on the surface of the dielectric layer 12, and then heated. As a result, the epoxy groups 54 are bonded to organic reaction parts 52 of the silane coupling agents. In this way, it is possible to immobilize the RTILs 53 in the surface of the dielectric layer 12. In the structure shown in the lower part of FIG. 6, anions and cations are electrostatically bonded to each other, and the anions can move the positive electrical charge (i.e., in the left/right direction in the drawing).

It is possible to form a first electrolyte layer 21 on a surface of the dielectric layer 12 by using any of the above-described Manufacturing Methods A to C.

Note that in this embodiment, a third electrolyte layer may be further formed on the second electrolyte layer 22 as described above. The third electrolyte layer may be formed by using, for example, a conductive polymer. For the third electrolyte layer, for example, at least one type of conductive polymer selected from the group consisting of polyethylene dioxythiophene (PEDOT), polypyrrole, polythiophene, polyaniline, and their derivatives. The third electrolyte layer may be formed by using, for example, chemical polymerization, electrolytic polymerization, or a method using a dispersion liquid containing a conductive polymer or a liquid containing a conductive polymer. When the third electrolyte layer is formed, it is preferably formed by using a method different from the method by which the second electrolyte layer 22 is formed.

As described above, the solid-electrolytic capacitor according to this embodiment includes first and second electrolyte layers 21 and 22 as the solid electrolyte layer 13. The first electrolyte layer 21 is an ion-conducting electrolyte layer, and the second electrolyte layer 22 is an electron-conducting electrolyte layer. That is, since the first electrolyte layer 21 is densely formed on the dielectric layer 12, and the second electrolyte layer 22, which exhibits an excellent conductive characteristic, is formed on the first electrolyte layer 21, the capacitance appearance ratio of the solid-electrolytic capacitor can be improved.

Further, as described above, in this embodiment, the first electrolyte layer 21 containing a salt part consisting of an anion and a cation derived from an RTIL is immobilized in the surface of the dielectric layer 12. Therefore, it is possible to prevent the RTIL from flowing out of the solid electrolyte layer 13, and thereby to prevent characteristics of the solid electrolyte layer 13 from deteriorating due to the outflow of the RTIL.

That is, when an ionic liquid is used for the solid electrolyte, there is a risk that the ionic liquid could flow out of the solid electrolyte layer 13. For example, if the ionic liquid flows out of the solid electrolyte layer 13 into a lead frame, characteristics of the solid-electrolytic capacitor may deteriorate (e.g., a leakage current (LC) may increase) due to the flowed-out ionic liquid. In contrast, in this embodiment, the first electrolyte layer 21 containing an ionic liquid is immobilized in the surface of the dielectric layer 12 by using a silane coupling agent or the like. Therefore, it is possible to prevent the ionic liquid flowing out of the solid electrolyte layer 13, and thereby to prevent the characteristics of the solid electrolyte layer 13 from deteriorating due to the flowed-out ionic liquid.

EXAMPLES

The present disclosure will be described hereinafter in a more detailed manner based on examples. However, the present disclosure is not limited to those examples.

Example 1

As a sample according to Example 1, a sample in which a first electrolyte layer 21 was formed by the above-described Manufacturing Method A (see FIG. 4) was manufactured.

Specifically, a capacitor element was formed by anodizing a sintered compact made of a tantalum fine powder, which was used as a valve metal, at 50V in an aqueous solution of phosphoric acid, and forming a dielectric layer 12 made of tantalum oxide on the entire surface of the sintered compact made of the tantalum fine powder.

Next, a first electrolyte layer 21 was formed on the dielectric layer 12 by the above-described the Manufacturing Method A (see FIG. 4). In Example 1, methoxysilyl group-introduced alkylamine-TFSI was used as the RTIL material 30 in which a silane coupling agent part 31 and a salt part 32 were integrated (i.e., combined) with each other.

Next, a second electrolyte layer 22 was formed by chemical polymerization. Specifically, an oxidant and a monomer, which was 3,4-ethylenedioxythiophene, for forming a conductive polymer were made to react with each other on the first electrolyte layer 21. After that, unreacted oxidant and monomer were washed by water or alcohol. The above-described operations were repeated a plurality of times, and a conductive polymer layer (second electrolyte layer) was thereby formed on the first electrolyte layer 21.

After the second electrolyte layer 22 was formed, a carbon layer was formed by immersing pellets in a carbon paste, pulling out them therefrom, and drying them at 120° C. for one hour. After the carbon layer was formed, a silver layer was formed by immersing pellets in a silver paste, pulling out them therefrom, and drying them at 120° C. for one hour. Next, valve-metal leads and electrodes were welded and connected. Further, the silver layer and the electrodes were connected to each other by using a conductive adhesive. After that, a solid-electrolytic capacitor was manufactured by forming an exterior resin.

Examples 2 to 5

As samples according to Examples 2 to 5, samples in each of which a first electrolyte layer 21 was formed by the above-described Manufacturing Method B (see FIG. 5) were manufactured. Note that each of Examples 2 to 5 was the same as Example 1 except that the first electrolyte layer 21 was formed by the Manufacturing Method B.

In Example 2, KBM-903 (amino-based, hydrophilic type, manufactured by Shin-Etsu Chemical Co., Ltd.) was prepared as the amino-based silane coupling agent 40 shown in FIG. 5. Then, the alkoxyl group of the amino-based silane coupling agent was hydrolyzed, and an amino-based silane coupling agent containing a silanol group was thereby obtained. After that, the OH group bonded to the surface of the dielectric layer 12 and the silanol group of the amino-based silane coupling agent were dehydrated and condensed, so that the amino-based silane coupling agent 40 was immobilized on the surface of the dielectric layer 12 by the covalent bonding.

After that, as shown in the central part of FIG. 5, salt of the amino-based silane coupling agent 40 and phosphoric acid 41 ($H_2PO_4^-$) was formed. Next, as shown in the lower part of FIG. 5, 1-ethyl-3-methylimidazolium-bis(trifluoromethylsulfonyl)imide (EMI-TFSI), which was used as the RTIL, was brought into contact with the salt, so that ions of the phosphoric acid 41 and those of the RTIL anion 42 were exchanged. Note that the RTIL anion 42 in this example was bis(trifluoromethylsulfonyl)imide (TFSI). Further, the residue (phosphoric acid and the like) in this process was washed away by alcohol. A first electrolyte layer 21 was formed by the above-described method. The rest of the manufacturing method was similar to that of Example 1.

Note that in Example 3, KBM-573 (amino-based, hydrophobic type, manufactured by Shin-Etsu Chemical Co., Ltd.) was used as the amino-based silane coupling agent 40. In Example 4, KBM-603 (amino-based, hydrophilic type, manufactured by Shin-Etsu Chemical Co., Ltd.) was used as the amino-based silane coupling agent 40, and 1-ethyl-3-methylimidazolium-ethylsulfonate (EMI-ES) was used as the RTIL. Note that the RTIL anion 42 in this example was ethylsulfonate (ES). In Example 5, KBM-6803 (amino-based, hydrophobic type, manufactured by Shin-Etsu Chemical Co., Ltd.) was used as the amino-based silane coupling agent 40, and 1-butyl-3-methylpyridinium-bis (fluorosulfonyl)imide (BMP-FSI) was used as the RTIL. Note that the RTIL anion 42 in this example was bis (fluorosulfonyl)imide (FSI). Samples according to Examples 3 to 5 were manufactured by the above-described manufacturing method in which the rest of the manufacturing method was similar to that of Example 2.

Examples 6 to 10

As samples according to Examples 6 to 10, samples in each of which a first electrolyte layer 21 was formed by the above-described Manufacturing Method C (see FIG. 6) were manufactured. Note that each of Examples 6 to 10 was the same as Example 1 except that the first electrolyte layer 21 was formed by the Manufacturing Method C.

In Example 6, KBM-403 (glycidyl-based, manufactured by Shin-Etsu Chemical Co., Ltd.) was prepared as the material 50 containing the silane coupling agent part 51 and the organic reaction part 52 shown in FIG. 6. KBM-403 contains an epoxy group as the organic reaction part 52. In Example 6, the silane coupling agent part 51 of KBM-403 and the OH group present in the surface of the dielectric layer 12 were made to have a silane coupling reaction therebetween (dehydration and condensation), and the silane coupling agent part 51 is thereby immobilized in the surface of the dielectric layer 12.

After that, as shown in the lower part in FIG. 6, an ionic liquid 53 containing epoxy groups 54 (epoxy group-introduced alkylamine-TFSI) was brought into contact with KBM-403 immobilized on the surface of the dielectric layer 12, and then heated. As a result, the epoxy groups 54 were bonded to the organic reaction part 52 (epoxy group) of the silane coupling agent. A first electrolyte layer 21 was formed by the above-described method. The rest of the manufacturing method was similar to that of Example 1.

Note that in Example 7, KBM-903 (amino-based, hydrophilic type, manufactured by Shin-Etsu Chemical Co., Ltd.) was used as the material 50. In Example 8, KBM-573 (amino-based, hydrophobic type, manufactured by Shin-Etsu Chemical Co., Ltd.) was used as the material 50. In Example 9, KBM-603 (amino-based, hydrophilic type, manufactured by Shin-Etsu Chemical Co., Ltd.) was used as the material 50. In Example 10, KBM-6803 (amino-based, hydrophobic type, manufactured by Shin-Etsu Chemical Co., Ltd.) was used as the material 50. Samples according to Examples 7 to 10 were manufactured by the above-described manufacturing method in which the rest of the manufacturing method was similar to that of Example 6.

Comparative Example 1

As a sample according to Comparative Example 1, a sample in which a first electrolyte layer was formed by using KBM-403 (glycidyl-based, manufactured by Shin-Etsu Chemical Co., Ltd.) was formed. Specifically, a silane coupling agent layer was formed by making the silane coupling agent part of KBM-403 and the OH group present in the surface of the dielectric layer have a silane coupling reaction therebetween (dehydration and condensation), and thereby immobilizing the silane coupling agent part in the surface of the dielectric layer. The rest of the manufacturing method was similar to that of Example 1.

Comparative Example 2

As a sample according to Comparative Example 2, a sample in which a first electrolyte layer was formed by using KBM-403 (glycidyl-based, manufactured by Shin-Etsu Chemical Co., Ltd.) and EMI-TFSI was formed. Specifically, the silane coupling agent part of KBM-403 and the OH group present in the surface of the dielectric layer were made to have a silane coupling reaction therebetween (dehydration and condensation), and the silane coupling agent part was thereby immobilized in the surface of the dielectric layer. After that, a first electrolyte layer 21 was formed by bringing the KBM-403 immobilized on the surface of the dielectric layer 12 into contact with the EMI-TFSI. The rest of the manufacturing method was similar to that of Example 1.

Comparative Example 3

As a sample according to Comparative Example 3, a sample was manufactured by using KBM-403 and EMI-TFSI. Specifically, a silane coupling agent layer was formed by making the silane coupling agent part of KBM-403 and the OH group present in the surface of the dielectric layer have a silane coupling reaction therebetween (dehydration and condensation), and thereby immobilizing the silane coupling agent part in the surface of the dielectric layer. Next, an oxidizer and a monomer, which was 3,4-ethylene-dioxythiophene, for forming a conductive polymer were made to react with each other. After that, unreacted oxidant and monomer were washed by water or alcohol. The above-described operations were repeated a plurality of times, and a conductive polymer layer was thereby formed on the first electrolyte layer 21. After that, the obtained capacitor element was immersed in 1-ethyl-3-methylimidazolium bis (trifluoromethylsulfonyl)imide (EMI-TFSI), which was used as the ionic liquid, for 10 minutes, kept at a room temperature for 30 minutes, and washed by alcohol. Through this process, an electrolyte layer consisting of a conductive polymer layer and 1-ethyl-3-methylimidazolium bis(trifluoromethylsulfonyl)imide, which was the ionic liquid, was formed. The rest of the manufacturing method was similar to that of Example 1.

<Evaluation of Samples>

Each of the solid-electrolytic capacitor manufactured as described above was mounted on an evaluation substrate through a reflow soldering process, and then their capacitor characteristics were evaluated (capacitance appearance ratios (Cap appearance ratios) and characteristic failure occurrence ratios were measured). Regarding the evaluation of the Cap appearance ratio, it was calculated by using a capacitance $C0$ that was measured in a 40% sulfuric acid solution after a dielectric oxide film was formed by electrolytic oxidation, and a capacitance $C1$ that was measured after the electrolytic capacitor was mounted on the evaluation substrate. That is, the Cap appearance ratio (%) was calculated by using the below-shown expression.

Cap appearance ratio $(\%)=C1/C0\times100$

Regarding the evaluation of the characteristic failure occurrence ratio, 20 electrolytic capacitors were mounted on their respective evaluation boards, and a voltage was applied for 500 hours under conditions of 85° C. and 85% RH. Then, the characteristic failure occurrence ratio was calculated from the number 20 of evaluated electrolytic capacitors and the number of electrolytic capacitors in each of which a characteristic failure occurred.

Evaluation results of the samples are shown in Table 1. As shown in Table 1, in Examples 1 to 10, the Cap appearance ratio was 83% or higher, meaning that the results were satisfactory. Further, in Examples 1 to 10, the characteristic failure occurrence ratio was 0%, meaning that the results were satisfactory.

In contrast, the Cap appearance ratio of Comparative Example 1 was 80%, i.e., was low. The reason for this is considered to be due to the fact that no ionic liquid was contained in the first electrolyte layer in Comparative Example 1.

Further, the Cap appearance ratio of Comparative Example 2 was 80%, i.e., was low, as in the case of Comparative Example 1. The reason for this is considered to be due to the fact that since the ionic liquid was not immobilized in the dielectric layer in Comparative Example 2, it flowed out by the subsequent washing, so that no ionic liquid was contained in the first electrolyte layer.

Meanwhile, the Cap appearance ratio was 93% or higher in Comparative Example 3, meaning that the result was satisfactory. However, the characteristic failure occurrence ratio of Comparative Example 3 was 10%, i.e., was high. The reason for this is considered to be due to the fact that KBM-403, which was used as the silane coupling agent, and the EMI-TFSI, which was used as the RTIL, were not electrostatically coupled nor chemically coupled in Comparative Example 3, so that the RTIL flowed out of the first electrolyte layer during the evaluation.

wherein the first electrolyte layer is an ion-conducting electrolyte layer, and the second electrolyte layer is an electron-conducting electrolyte layer.

2. The solid-electrolytic capacitor according to claim 1, wherein the first electrolyte layer contains a material represented by a below-shown Formula (1), $$
\begin{array}{c}
& \overset{\displaystyle X^-}{} \\
& R^{1+} \\
& | \\
R^2 - O - Si - O - R^2 \\
& | \\
& O \\
& \diagup \\
& M
\end{array}
\tag{1}
$$

where M in the above-shown Formula (1) represents a valve metal atom;
$R^{1+}$ represents a functional group of at least one type of cation selected from the group consisting of an imidazolium derivative, a pyrrolidinium derivative, a piperidinium derivative, a pyridinium derivative, a morpho-

TABLE 1

| | Silane coupling agent | Ionic liquid | Manufacturing Method | Cap appearance ratio | Short-ciuit occurrence ratio |
|---|---|---|---|---|---|
| Example 1 | — | Methoxysilyl group-introduced alkylamine-TFSI | Manufacturing Method A | 94% | 0% |
| Example 2 | KBM-903 (amino-based, hydrophilic type) | EMI-TFSI | Manufacturing Method B | 90% | 0% |
| Example 3 | KBM-573 (amino-based, hydrophobic type) | | | 85% | 0% |
| Example 4 | KBM-603 (amino-based, hydrophilic type) | EMI-ES | | 90% | 0% |
| Example 5 | KBM-6803 (amino-based, hydrophobic type) | BMP-FSI | | 84% | 0% |
| Example 6 | KBM-403 (glycidyl-based) | Epoxy group-introduced alkylamine-TFSI | Manufacturing Method C | 84% | 0% |
| Example 7 | KBM-903 (amino-based, hydrophilic type) | | | 92% | 0% |
| Example 8 | KBM-573 (amino-based, hydrophobic type) | | | 86% | 0% |
| Example 9 | KBM-603 (amino-based, hydrophilic type) | | | 92% | 0% |
| Example 10 | KBM-6803 (amino-based, hydrophobic type ) | | | 83% | 0% |
| Comparative Example 1 | KBM-403 (glycidyl-based) | — | — | 80% | 0% |
| Comparative Example 2 | KBM-403 (glycidyl-based) | EMI-TFSI | — | 80% | 0% |
| Comparative Example 3 | KBM-403 (glycidyl-based) | EMI-TFSI (immersed after chemical polymerization) | — | 93% | 10% |

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:
1. A solid-electrolytic capacitor comprising:
an anode member made of a valve metal;
a dielectric layer formed on the anode member; and
a solid electrolyte layer formed on the dielectric layer,
wherein the solid electrolyte layer comprises:
a first electrolyte layer formed on the dielectric layer; and
a second electrolyte layer formed on the first electrolyte layer, and linium derivative, an ammonium derivative, a phosphonium derivative, and a sulfonium derivative, and has a carbon chain having a carbon number of 1 to 20 between the functional group of the cation and a Si molecule, and has an ester bond, an ether bond, an amide bond, an imide bond, a carbon-carbon unsaturated bond, a carbon ring, or a heterocyclic ring between chains;
in the above-shown Formula (1), $R^2$ represents one of a hydrogen atom, a carbon chain having a carbon number of 1 to 4, a valve metal atom, or a multimer in which materials each represented by Formula (1) are condensation-polymerized and connected to each other by —Si—O—Si—; and
in the above-shown Formula (1), $X^-$ represents at least one type of anion selected from chlorine, bromine, iodine, acetic acid, decanoic acid, sulfuric acid, lactic acid, nitric acid, benzoic acid, hydroxide, methylsulfate, methanesulfonic acid, ethanesulfonic acid, octanesulfonic acid, allylsulfonic acid, 1,1,2,2-tetrafluoroethanesulfonic acid, nonafluorobutanesulfonic acid, trifluoromethanesulfonic acid, p-toluenesulfonic acid, aminoacetic acid, trifluoroacetic acid, 2-hydroxy-2-phenylacetic acid, 2-aminopropanoic acid, thiosalicylic acid, thiocyanic acid, dicyanamide, dimethylphosphonic acid, diethylphosphonic acid, dibutylphosphonic acid, bis(2,4,4-trimethylpentyl)phosphonic acid, hexafluorophosphoric acid, tetrafluoroboric acid, hexafluoroantimonic acid, tetrachloroaluminic acid, tetrachloroferrate (III), tris(trifluoromethylsulfonyl) methane, bis(fluorosulfonyl)imide, bis(trifluoromethylsulfonyl)imide, and bis(pentafluoroethylsulfonyl)imide.

3. The solid-electrolytic capacitor according to claim 2, wherein: in the first electrolyte layer, M in the above-shown Formula (1) is a valve metal atom present in a surface of the dielectric layer; the first electrolyte layer is covalently bonded in the surface of the dielectric layer as represented by Si—O—M; and the first electrolyte layer is in contact with the second electrolyte layer.

4. The solid-electrolytic capacitor according to claim 3, wherein a conductivity of the second electrolyte layer is higher than that of the first electrolyte layer.

5. The solid-electrolytic capacitor according to claim 1, wherein the second electrolyte layer contains a conductive polymer.

6. A method for manufacturing a solid-electrolytic capacitor comprising:

a first step of forming a dielectric layer on an anode member made of a valve metal; and a second step of forming a solid electrolyte layer on the dielectric layer, wherein the second step comprises:

a third step of forming a first electrolyte layer on the dielectric layer; and a fourth step of forming a second electrolyte layer on the first electrolyte layer, and wherein the third step comprises forming a layer containing a material represented by the below-shown Formula (1) on the dielectric layer, $$R^2-O-\underset{\underset{\underset{M}{/}}{\overset{\overset{X^-}{|}}{\underset{|}{\overset{R^{1+}}{|}}}}{Si}-O-R^2 \tag{1}$$

where M in the above-shown Formula (1) represents a valve metal atom;

$R^{1+}$ represents a functional group of at least one type of cation selected from the group consisting of an imidazolium derivative, a pyrrolidinium derivative, a piperidinium derivative, a pyridinium derivative, a morpholinium derivative, an ammonium derivative, a phosphonium derivative, and a sulfonium derivative, and has a carbon chain having a carbon number of 1 to 20 between the functional group of the cation and a Si molecule, and has an ester bond, an ether bond, an amide bond, an imide bond, a carbon-carbon unsaturated bond, a carbon ring, or a heterocyclic ring between chains;

in the above-shown Formula (1), $R^2$ represents one of a hydrogen atom, a carbon chain having a carbon number of 1 to 4, a valve metal atom, or a multimer in which materials each represented by Formula (1) are condensation-polymerized and connected to each other by —Si—O—Si—; and in the above-shown Formula (1), $X^-$ represents at least one type of anion selected from chlorine, bromine, iodine, acetic acid, decanoic acid, sulfuric acid, lactic acid, nitric acid, benzoic acid, hydroxide, methylsulfate, methanesulfonic acid, ethanesulfonic acid, octanesulfonic acid, allylsulfonic acid, 1,1,2,2-tetrafluoroethanesulfonic acid, nonafluorobutanesulfonic acid, trifluoromethanesulfonic acid, p-toluenesulfonic acid, aminoacetic acid, trifluoroacetic acid, 2-hydroxy-2-phenylacetic acid, 2-aminopropanoic acid, thiosalicylic acid, thiocyanic acid, dicyanamide, dimethylphosphonic acid, diethylphosphonic acid, dibutylphosphonic acid, bis(2,4,4-trimethylpentyl)phosphonic acid, hexafluorophosphoric acid, tetrafluoroboric acid, hexafluoroantimonic acid, tetrachloroaluminic acid, tetrachloroferrate (III), tris(trifluoromethylsulfonyl) methane, bis(fluorosulfonyl)imide, bis(trifluoromethylsulfonyl)imide, and bis(pentafluoroethylsulfonyl)imide.

7. The method for manufacturing a solid-electrolytic capacitor according to claim 6, wherein the third step comprises a step A of hydrolyzing an alkoxyl group $OR^3$ of an ionic liquid represented by a below-shown Formula (2), thereby obtaining an ionic liquid containing a silanol group represented by the below-shown Formula (3), then dehydrating and condensing an OH group bonded to a surface of the dielectric layer and a silanol group of the below-shown Formula (3), and thereby immobilizing a material represented by the above-shown Formula (1) in the surface of the dielectric layer, $$R^3O-\underset{\underset{OR^3}{|}}{\overset{\overset{X^-}{|}}{\underset{|}{\overset{R^{1+}}{|}}}}{Si}-OR^3 \tag{2}$$

$$HO-\underset{\underset{OH}{|}}{\overset{\overset{X^-}{|}}{\underset{|}{\overset{R^{1+}}{|}}}}{Si}-OH \tag{3}$$

where $R^3$ in the above-shown Formula (2) represents a carbon chain having a carbon number of 1 to 4.

8. The method for manufacturing a solid-electrolytic capacitor according to claim 6, wherein the third step comprises:

a step B of hydrolyzing an alkoxyl group of an amino-based silane coupling agent, thereby obtaining an amino-based silane coupling agent containing a silanol group, then dehydrating and condensing an OH group bonded to a surface of the dielectric layer and a silanol group of the amino-based silane coupling agent, and thereby immobilizing the amino-based silane coupling agent on the surface of the dielectric layer; and a step C of, after the step B, forming salt of the amino-based silane coupling agent and phosphoric acid, bringing the salt into contact with an anion $X^-$, exchanging ions therebetween, thereby bonding them by an electrical interaction between an amino group and the anion $X^-$, and forming a material represented by the above-shown Formula (1).

9. The method for manufacturing a solid-electrolytic capacitor according to claim 6, wherein the third step comprises:

a step D of hydrolyzing an alkoxyl group of at least one silane coupling agent selected from an amino-based silane coupling agent, an epoxy-based silane coupling agent, and a thiol-based silane coupling agent, obtaining a silane coupling agent containing a silanol group, then dehydrating and condensing an OH group bonded to a surface of the dielectric layer and a silanol group of the silane coupling agent, and thereby immobilizing the silane coupling agent on the surface of the dielectric layer; and a step E of, after the step D, bringing an ionic liquid containing an epoxy group represented by a below-shown Formula (4) into contact with the silane coupling agent formed on the surface of the dielectric layer in the step D, then heating them, bonding an epoxy group of the below-shown Formula (4) to an amino group, an epoxy group, or a thiol group of the silane coupling agent, and forming a material represented by the above-shown Formula (1).

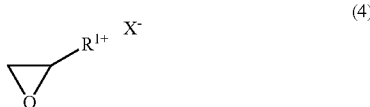

(4)

10. The method for manufacturing a solid-electrolytic capacitor according to claim 6, wherein the fourth step comprises a step of forming a conductive polymer on the first electrolyte layer by using chemical polymerization or a dispersion liquid containing a conductive polymer or a liquid containing a conductive polymer.

11. The method for manufacturing a solid-electrolytic capacitor according to claim 10, further comprising a fifth step of forming a third electrolyte layer on the second electrolyte layer, wherein the fifth step comprises a step of forming the third electrolyte layer containing a conductive polymer on the second electrolyte layer by using a method selected from chemical polymerization, electrolytic polymerization, or a method using a dispersion liquid containing a conductive polymer or a liquid containing a conductive polymer, the method used in the fifth step being different from the method used in the fourth step.

* * * * *